(12) United States Patent
Saban

(10) Patent No.: US 6,388,356 B1
(45) Date of Patent: May 14, 2002

(54) METHODS AND APPARATUS FOR CONTROLLING ELECTROMAGNETIC FLUX IN DYNAMOELECTRIC MACHINES

(75) Inventor: Daniel M. Saban, Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/475,517

(22) Filed: Dec. 30, 1999

(51) Int. Cl.$^7$ ............................. H02K 3/28; H02P 7/00
(52) U.S. Cl. ..................... 310/184; 310/180; 310/185; 318/523; 318/526; 318/529
(58) Field of Search ................. 318/523, 526, 318/527, 529, 773, 776; 310/180, 184, 185

(56) References Cited

U.S. PATENT DOCUMENTS

| | | | | |
|---|---|---|---|---|
| 3,633,057 A | * | 1/1972 | Smith | 310/184 |
| 4,103,213 A | * | 7/1978 | Landgraf | 310/184 |
| 4,322,665 A | | 3/1982 | Landgraf | 318/774 |
| 4,463,303 A | | 7/1984 | Kirschbaum | 318/776 |
| 4,473,788 A | | 9/1984 | Kirshbaum | 318/776 |
| 4,486,699 A | | 12/1984 | Hoemann et al. | 318/772 |
| 4,489,265 A | | 12/1984 | Kuznetsov | 318/773 |
| 4,511,831 A | * | 4/1985 | McInnis | 318/351 |
| 4,737,701 A | | 4/1988 | Hoemann et al. | 318/772 |
| 4,785,213 A | | 11/1988 | Satake | 318/116 |
| 4,841,188 A | | 6/1989 | Hao | 318/200 |
| 4,935,678 A | | 6/1990 | Houst | 318/268 |
| 4,937,513 A | | 6/1990 | Hoemann et al. | 318/772 |
| 4,954,740 A | | 9/1990 | Brigham | 318/185 |
| 5,177,423 A | | 1/1993 | Nakamura et al. | 318/767 |
| 5,212,435 A | | 5/1993 | Dutro | 318/785 |
| 5,227,710 A | | 7/1993 | Lewus | 318/771 |
| 5,436,546 A | | 7/1995 | Trumpler et al. | 318/773 |
| 5,514,943 A | | 5/1996 | Shapess | 318/772 |
| 5,521,471 A | | 5/1996 | Yang | 318/251 |

* cited by examiner

*Primary Examiner*—Burton S. Mullins
(74) *Attorney, Agent, or Firm*—Karl Vick, Esq.; Damian Wasserbauer, Esq.; Armstrong Teasdale LLP

(57) ABSTRACT

A method of adjusting speed and torque of a dynamoelectric machine is disclosed. The machine includes a main winding, and a divided winding each configured to generate a plurality of poles. The method includes the steps of energizing the main winding and controlling the amount of electromagnetic flux at each pole.

23 Claims, 1 Drawing Sheet

METHODS AND APPARATUS FOR CONTROLLING ELECTROMAGNETIC FLUX IN DYNAMOELECTRIC MACHINES

BACKGROUND OF THE INVENTION

This invention relates generally to electric motors and more particularly, to methods for controlling the torque produced in electric motors.

Electric motors typically include a stationary outer portion, or housing, with a bore therethrough, a stator mounted in the housing, a rotor rotatably mounted in the housing, and a rotor core having a bore therethrough and a substantially straight shaft extending through the rotor core bore. The shaft is rotatably supported by a set of bearings and rotates utilizing magnetic fields. The stator includes a bore therethrough, stator coils and stator windings, with each stator coil wound around a respective stator winding. The rotor extends through the stator bore and includes a set of windings. Electrical current flows through the stator coil in the respective stator winding in a time sequential manner, which generates a stator magnetic field that repels/attracts a rotor magnetic field. The electrical current flowing through the stator constantly changes in time and direction, resulting in a constantly changing stator magnetic field. Due to the changing current direction and a resulting rotating stator magnetic field of constant magnitude, the rotor is caused to rotate and generate mechanical energy.

Many electric motors are fabricated to operate at multiple speeds. One way in which multiple speeds are obtained is by providing additional windings, connected a variety of ways in the circuit. Sometimes windings with a diminished number of turns of wire at a pole are created by "tapping" the existing windings. The tapping of existing windings disconnects part of a winding from the rest of the circuit. However, depending on the location of the tap, the number of turns of wire tapped, and the remaining turns of wire active in the machine, an electromagnetic imbalance in the normal near-sinusoidal flux distribution can be created because a number of adjacent poles are not energized. Even harmonics and sub-harmonics are added to the decomposition of flux distribution when poles are tapped adding a new forcing function which drives vibration and adds losses, reduces the effect of the electromagnetic flux, and results in less torque per ampere of stator current.

One method for overcoming an electromagnetic imbalance is to provide a tap only between full complements of poles. This method is similar to electrically providing additional, distinct windings, and has the manufacturing benefit, of depending on fewer pieces of machinery to create the final set of windings, although unenergized poles are still present.

It would therefore be desirable to provide another method of controlling the speed of an electric motor that does not suffer from electrical imbalance and is distinct electromagnetically from conventional methods such as the tapping between full complements of poles and therefore eliminating even subharmonics of the decomposition of the flux distribution.

BRIEF SUMMARY OF THE INVENTION

In an exemplary embodiment, a method of adjusting speed and torque of a dynamoelectric machine is disclosed. The machine includes a main winding, and a divided winding each configured to generate a plurality of poles. The main winding includes winding at each pole which are alternately wound, the divided winding includes winding which are consecutively wound. The method includes the steps of energizing the main winding and controlling the amount of electromagnetic flux at each pole. The amount of electromagnetic flux at each pole is controlled by energizing the divided winding.

DETAILED DESCRIPTION OF THE INVENTION

Figure 1:
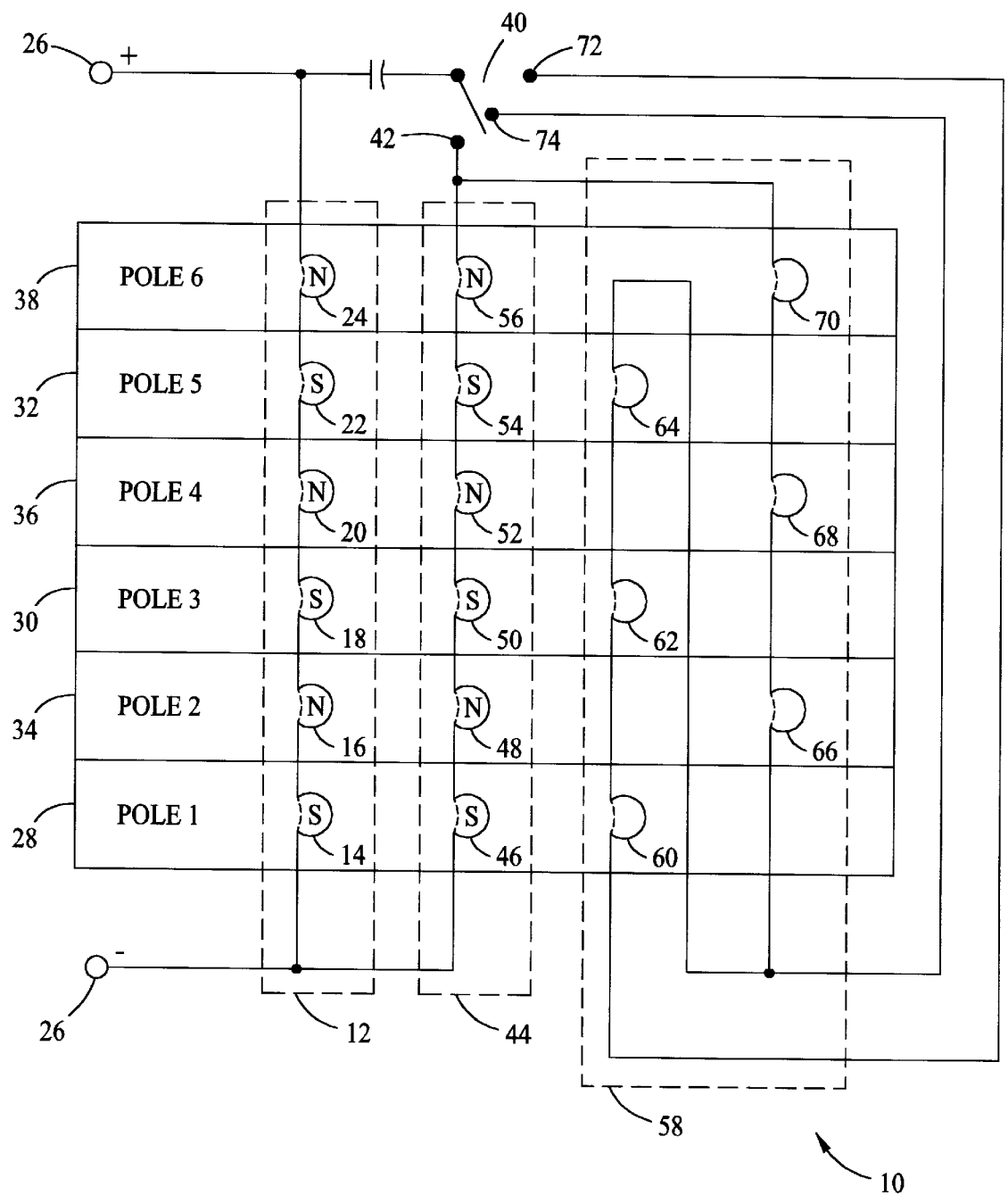
FIG. 1 is a schematic diagram of one embodiment of a divided winding motor.

FIG. 1 is a schematic diagram illustrating one embodiment of a divided winding motor 10. In motor 10, synchronous speed and fundamental pole structure are held constant.

Divided winding motor 10 is a six-pole motor. Main winding 12, includes six windings 14, 16, 18, 20, 22, and 24. Each winding 14, 16, 18, 20, 22, and 24 has a polarity, commonly referred to as a "north" or "south" pole depending on the direction a wire (not shown) of each winding 14, 16, 18, 20, 22, and 24 is wound with respect to a voltage source 26. For purposes of illustration, windings 14, 16, 18, 20, 22, and 24 are wound such that windings 14, 18, and 22 located at poles one 28, three 30, and five 32 respectively, are "south" poles or "odd" poles. Windings 16, 20, and 24 located at poles two 34, four 36, and six 38 respectively, are "north" poles or "even" poles.

Divided winding motor 10 includes a switch 40 that, when set in a high position 42, energizes a "start" or auxiliary winding 44 which supplies an increased amount of torque at poles 28, 30, 32, 34, 36, and 38 required to get a rotor (not shown) rotating under a start condition. Auxiliary winding 44 includes six windings 46, 48, 50, 52, 54, and 56. Each winding 46, 48, 50, 52, 54, and 56 has a polarity, commonly referred to as a "north" or "south" pole depending on the direction the wire which constitutes windings 46, 48, 50, 52, 54, and 56 is wound with respect to voltage source 26. For purposes of illustration, auxiliary windings 46, 48, 50, 52, 54, and 56 are wound such that windings 46, 50, and 54 located at poles one 28, three 32, and five 36 respectively, are "south" poles or "odd" poles. Windings 48, 52, and 56 located at poles two 34, four 38, and six 42 respectively, are "north" poles or "even" poles.

Motor 10 further includes a divided winding 58 in series with auxiliary winding 44. Divided winding 58 differs from main winding 12 and auxiliary winding 44 since individual windings of divided winding 58 are not wound at alternating poles. Also individual windings of divided winding 58 are wound in a direction opposite the windings of main winding 12 or auxiliary winding 44. Divided winding 58 includes three consecutive windings 60, 62, and 64 located at "south" poles of motor 10, or "odd" poles one 28, three 30, and five 32. Three more consecutive windings 66, 68, and 70 are located at "north" poles of motor 10, or "even" poles two 34, four 36, and six 38.

The consecutive windings allow divided winding 58 to be energized in different ways to control an amount of electromagnetic flux at poles 28, 30, 32, 34, 36, and 38. In one embodiment, the full winding is energized as illustrated by switch position 72. In an alternative embodiment, only the "north" poles of divided winding 58 are energized, as illustrated by switch position 74. By switching in any or all of divided winding 58, current is reduced in auxiliary winding 44, thereby changing the amount of electromagnetic flux at each pole 28, 30, 32, 34, 36, and 38. In a further alternative embodiment, divided winding 58 is in series with main winding 12. In such an embodiment, switching into the circuit windings of divided winding 58 reduces current of main winding 12.

Other embodiments can be constructed and those described above are illustrative, not limiting. For example, the wire that constitutes divided winding 58 can be wound in a same direction as the wire that constitutes the windings of main winding 12 or auxiliary winding 44. In such an embodiment, "north" poles are located at poles one 28, three 30, and five 32 and "south" poles are located at poles two 34, four 36, and six 38 to add to the electromagnetic flux generated by main winding 12. In another embodiment, polarity of voltage source 26, as connected to divided winding 58, and with respect to the polarity of main winding 12 or auxiliary winding 44, can be connected such that the windings of divided winding 58 become either "north" or "south" poles regardless of the direction the wire which constitutes the windings of divided winding 58 are wound.

Divided winding motor 10 is different than other consequent pole winding designs (not shown) in that only the strength, or torque, of the motor, and subsequently the operating point, is changed. The divided winding motor 10 does not suffer from the electrical imbalance of "tapped" winding motors, which are well known in the art, and therefore is distinct electro-magnetically from conventional methods of tapping full complements of poles. When "north" poles and "south" poles of divided winding 58 are mirror images of one another, and energized together, electromagnetic imbalance is limited. However, by winding main winding 12 and divided winding 58, or if included, auxiliary winding 44, with different wire diameters and/or a different number of turns of wire in the windings, different performances and a material cost savings can be achieved.

While the invention has been described in terms of various specific embodiments, those skilled in the art will recognize that the invention can be practiced with modification within the spirit scope of the claims.

What is claimed is:

1. A method of adjusting speed and torque of a dynamoelectric machine, the machine including a main winding, an auxiliary winding, and a divided winding connected in series with the auxiliary winding, the divided winding configured to generate a plurality of poles, said method comprising the steps of:

energizing the main winding;

controlling an amount of electromagnetic flux at each pole; and energizing at least one set of poles of the divided winding with a power source, the power source energizing both the main winding and the divided winding.

2. A method according to claim 1 wherein energizing the divided winding comprises energizing the divided winding wound in a direction opposite to a direction of a winding of the main winding located at a same pole and powered at a same polarity.

3. A method according to claim 1 wherein energizing the divided winding comprises energizing the divided winding wound in a direction opposite to a direction of a winding of the main winding located at a same pole and powered at an opposite polarity.

4. A method according to claim 1 wherein energizing the divided winding comprises energizing the divided winding wound in a direction the same as a direction of a winding of the main winding located at a same pole and powered at a same polarity.

5. A method according to claim 1 wherein energizing the divided winding comprises energizing the divided winding wound in a direction the same as a direction of a winding of the main winding located at a same pole and powered at an opposite polarity.

6. A method according to claim 1 further comprising the step of de-energizing the main winding.

7. A method according to claim 1 further comprising the step of reducing an amount of current in the main winding by switching in circuit windings of the divided winding.

8. A dynamoelectric machine comprising:

a stator mounted in a housing and comprising a bore therethrough, said stator further comprising a main winding comprising a plurality of poles and configured to be connected to a power source, an auxiliary winding configured to be connected to a power source to provide an increased amount of torque to at least one of the plurality of poles, and a divided winding configured to be connected to the power source to change an amount of electromagnetic flux generated in at least one of the plurality of poles, said divided winding comprising a first plurality of consecutive windings wound about a plurality of "odd" poles and a second plurality of consecutive windings wound about a plurality of "even" poles; and a rotor comprising a rotor core having a bore therethrough and a substantially straight shaft extending through said rotor core bore, said rotor rotatably mounted in the housing and extending through said stator bore, said shaft rotatably supported by a set of bearings.

9. A dynamoelectric machine in accordance with claim 8 wherein said divided winding comprises at least one winding wound in a direction opposite to a direction of a winding of the main winding located at the same pole.

10. A dynamoelectric machine in accordance with claim 9 wherein said at least one winding is energized by the power source with a polarity opposite from the polarity of the power source energizing said main winding.

11. A dynamoelectric machine in accordance with claim 9 wherein said at least one winding is energized by the power source with a polarity the same as the polarity of the power source energizing said main winding.

12. A dynamoelectric machine in accordance with claim 8 wherein said divided winding comprises at least one winding wound in a direction the same as a direction of a winding of the main winding located at a same pole.

13. A dynamoelectric machine in accordance with claim 12 wherein said at least one winding is energized by the power source with a polarity opposite from the polarity of the power source energizing said main winding.

14. A dynamoelectric machine in accordance with claim 12 wherein said at least one winding is energized by the power source with a polarity the same as the polarity of the power source energizing said main winding.

15. A dynamoelectric machine in accordance with claim 8 configured to remove the power source from said main winding while said divided winding remains connected to the power source.

16. A dynamoelectric machine in accordance with claim 8 configured to apply the power source to only the "odd" pole windings of said divided winding.

17. A dynamoelectric machine in accordance with claim 8 configured to apply the power source to only the "even" pole windings of said divided winding.

18. A dynamoelectric machine in accordance with claim 8 wherein said divided winding and said main winding are wound with wire of a different diameter.

19. A dynamoelectric machine in accordance with claim 8 wherein said "even" pole windings of said divided winding and said "odd" pole windings of said divided winding are wound with wire of a different diameter.

20. A dynamoelectric machine in accordance with claim 8 wherein said divided winding and said main winding further comprise poles wound with a different number of turns of wire.

21. A dynamoelectric machine in accordance with claim 8 wherein said "even" pole windings of said divided winding and said "odd" pole windings are wound with a different number of turns of wire.

22. A dynamoelectric machine in accordance with claim 8 wherein said divided winding and said main winding are connected in series when said divided winding is energized.

23. A dynamoelectric machine in accordance with claim 8 wherein said divided winding and an auxiliary winding are connected in series when said divided winding is energized.

* * * * *